US012782957B2

(12) United States Patent
Wang et al.

(10) Patent No.: US 12,782,957 B2
(45) Date of Patent: Nov. 3, 2026

(54) METHOD AND SYSTEM FOR CONTROLLING POSITION AND ATTITUDE SEPARATION OF TILTABLE ROTORCRAFT

(71) Applicant: Hangzhou City University Binjiang Innovation Center, Hangzhou City (CN)

(72) Inventors: Fang Wang, Hangzhou City (CN); Tiancai Wu, Hangzhou City (CN); Jie Bai, Hangzhou City (CN); Lei Wang, Hangzhou City (CN); Chao Wang, Hangzhou City (CN); Chengjie Jiang, Hangzhou City (CN)

(73) Assignee: Hangzhou City University Binjiang Innovation Center, Hangzhou City (CN)

( * ) Notice: Subject to any disclaimer, the term of this patent is extended or adjusted under 35 U.S.C. 154(b) by 56 days.

(21) Appl. No.: 19/180,379

(22) Filed: Apr. 16, 2025

(65) Prior Publication Data

US 2026/0079497 A1 Mar. 19, 2026

(30) Foreign Application Priority Data

Aug. 27, 2024 (CN) ........................ 202411185172.0

(51) Int. Cl.

| | |
|---|---|
| ***G05D 1/495*** | (2024.01) |
| ***G05D 1/46*** | (2024.01) |
| ***G05D 101/15*** | (2024.01) |
| ***G05D 109/25*** | (2024.01) |

(52) U.S. Cl.

CPC ............... *G05D 1/495* (2024.01); *G05D 1/46* (2024.01); *G05D 2101/15* (2024.01); *G05D 2109/25* (2024.01)

(58) Field of Classification Search

CPC ...... G05D 1/495; G05D 1/46; G05D 2109/25; G05D 2101/15

See application file for complete search history.

(56) References Cited

FOREIGN PATENT DOCUMENTS

CN 118466540 A * 8/2024 ............. G05B 11/42

* cited by examiner

*Primary Examiner* — Michael D Lang

(74) *Attorney, Agent, or Firm* — Tutunjian & Bitetto, P.C.

(57) ABSTRACT

A method and system for controlling position and attitude separation of a tiltable rotorcraft is provided, including a capability prediction module, a position control subsystem, a velocity control subsystem, an attitude angle control subsystem, an angular rate control subsystem, a control allocation module, and a tiltable rotorcraft. After expected position and attitude commands are corrected by the capability prediction module, expected force and torque commands are output by various control subsystems, and after receiving the force and torque commands, the control allocation module is further configured to calculate actual control commands of the aircraft, such as a tilt angle of a rotor assembly and a rotor speed, thus controlling the tiltable rotorcraft to perform the tracking of the expected position and attitude commands.

10 Claims, 11 Drawing Sheets

METHOD AND SYSTEM FOR CONTROLLING POSITION AND ATTITUDE SEPARATION OF TILTABLE ROTORCRAFT

CROSS-REFERENCE TO RELATED APPLICATION

This patent application claims the benefit and priority of Chinese Patent Application No. 202411185172.0 filed with the China National Intellectual Property Administration on Aug. 27, 2024, the disclosure of which is incorporated by reference herein in its entirety as part of the present application.

TECHNICAL FIELD

The present disclosure relates to the technical field of aircraft control, and in particular to a method and system for controlling position and attitude separation of a tiltable rotorcraft.

BACKGROUND

In recent years, rotorcraft, due to its small size, low cost and simple control, has been widely used in many fields, such as agricultural and forestry operations, emergency rescue, and has become a solution for many industries to reduce cost and increase efficiency and avoid personnel safety risks. However, with the increasingly complex application scenarios, higher requirements are put forward for the performance of the rotorcraft. For example, some narrow scenarios of emergency rescue require the aircraft to have omni-directional maneuverability, and some scenarios of target monitoring and tracking require the aircraft to have an ability of attitude change during hovering, and so on. However, due to the constraint of its configuration, the traditional rotorcraft has a strong coupling relationship between position and attitude motions thereof, which has been difficult to meet the above requirements for its performance in complex application scenarios. To solve this problem, researchers have carried out research on a novel-structure aircraft with a tiltable rotor. By installing mechanical structures such as steering engine, the rotor assembly has the ability to rotate around the fuselage, thus decoupling the position and attitude motions, and further improving the performance of the aircraft to meet the needs of complex mission scenarios.

Although such tiltable rotorcrafts have stronger maneuverability and can support more maneuvering modes, the following problems, such as strong nonlinearity, strong coupling (between attitude channels), strong uncertainty (for model parameters) and non-affine control allocation, bring greater challenges to the design of the control system.

SUMMARY

A main objective of the present disclosure is to provide a method and system for controlling position and attitude separation of a tiltable rotorcraft, aiming at solving the technical problem above.

To achieve the objective above, the present disclosure provides a method for controlling position and attitude separation of the tiltable rotorcraft.

The method for controlling position and attitude separation of the tiltable rotorcraft includes:

establishing six-degree-of-freedom motion equations of translational motion of center-of-mass and rotation around the center-of-mass of the tiltable rotorcraft;

establishing a control efficiency model of the tiltable rotorcraft;

integrating the six-degree-of-freedom motion equations and the control efficiency model into a control model designed for a control system.

establishing a capability prediction model according to the control model, and outputting a position and attitude angle correction command through the capability prediction model.

A position control subsystem, a velocity control subsystem, an attitude angle control subsystem, an angular rate control subsystem and a control allocation module are constructed according to the control model, and an actual control command (a tilt angle of a rotor assembly and a rotor speed) of an aircraft is output according to a correction command given by the capability prediction model.

In an embodiment, a kinematic equation of the translational motion of the center-of-mass can be established as:

$$\dot{P} = v;$$

where:

$P=[x, y, z]^T$ represents three-axis positions of the aircraft;

$v=[v_x, v_y, v_z]^T$ represents three-axis velocity of the aircraft;

the dynamic equation of the translational motion of the center-of-mass can be expressed as:

$$m\dot{v} = mg + f_v + \Delta f_v;$$

where:

m represents a mass of the aircraft;

$g=[0, 0, g]^T$ represents a gravitational acceleration vector;

$\Delta f_v$ represents a lumped force disturbance;

where $f_v$ represents a control force, which is defined as:

$$f_v = R_b^e\, {}^b f_v = R_b^e \sum\nolimits_{i=1}^4 R_{p,i}^b R_{p',i}^{p,i} T_i;$$

where:

$${}^b f_v = R_b^e \sum\nolimits_{i=1}^4 R_{p,i}^b R_{p',i}^{p,i} T_i$$

represents a resultant force in a body coordinate system of the aircraft;

$T_i=[0, 0, -T_i]^T$ represents a rotor thrust of an $i^{th}$ rotor;

$$T_i = c_T n_i^2,\ c_T$$

represents a thrust coefficient;

$n_i$ represents a rotor speed of the it rotor; and $$R_b^e,\ R_{p,i}^b,\ R_{p',i}^{p,i}$$

represent a conversion relationship from the body coordinate system to a geodetic coordinate system, a conversion relationship from a fixed coordinate system of a propeller disc of the $i^{th}$ rotor to the body coordinate system, and a conversion relationship from a comoving coordinate system of the propeller disc of the $i^{th}$ rotor to the fixed coordinate system of the propeller disc, respectively.

In an embodiment, a kinematic equation of the rotation around the center-of-mass can be established as:

$$\dot{\Omega} = G_w \omega;$$

where:

$\Omega=[\phi, \theta, \psi]^T$ represents an attitude angle of the aircraft;

$\phi$, $\theta$, $\psi$ represent a roll angle, a pitch angle and a yaw angle, respectively;

$\omega=[p, q, r]^T$ represents an angular rate of the aircraft;

p, q, r represents a roll angular rate, a pitch angular rate and a yaw angular rate, respectively;

a matrix $G_W$ is defined as:

$$G_w = \begin{bmatrix} 1 & \tan\theta\sin\phi & \tan\theta\cos\phi \\ 0 & \cos\phi & -\sin\phi \\ 0 & \sin\phi/\cos\theta & \cos\phi/\cos\theta \end{bmatrix};$$

the dynamic equation of the rotation around of the center-of-mass is:

$$J\dot{\omega} + \omega \times J\omega = G_a + \tau + \Delta\tau;$$

where:

$J=\mathrm{diag}\{J_{xx}, J_{yy}, J_{zz}\}$ represents an inertia tensor matrix;

$G_a$ represents a gyroscopic torque;

$\tau$ represents a triaxial torque generated by a propeller;

$\Delta\tau$ represents a lumped torque disturbance;

a control torque $\tau$ is defined as:

$$\tau = \tau_t + \tau_d;$$

Where:

$$\tau_t = \sum_{i=1}^{4} \left({}^b O_{p,i} \times R_{p,i}^b R_{p',i}^{p,i} T_i\right)$$

represents a torque generated by four rotor thrusts;

$$\tau_d = \sum_{i=1}^{4} R_{p,i}^b R_{p',i}^{p,i} \left((-1)^{i-1} c_M n_i^2\right)$$

represents a torque formed by a reaction torque for the rotor;

${}^bO_{p,i}$ represents a position of an origin of the fixed coordinate system of the propeller disc in the body coordinate system;

$${}^b O_{p,i} = R_b^{p,i} l;$$

$l=[1, 0, 0]^T$ represents a length of an arm; and $c_M$ represents a coefficient of the reaction torque.

In an embodiment, according to equations of the control force $f_v$ and the control torque $\tau$, it can be obtained:

$$\begin{bmatrix} {}^b f_v \\ \tau \end{bmatrix} = \begin{bmatrix} \sum_{i=1}^{4} R_{p,i}^b R_{p',i}^{p,i} T_i \\ \sum_{i=1}^{4} \left({}^b O_{p,i} \times R_{p,i}^b R_{p',i}^{p,i} T_i\right) + \sum_{i=1}^{4} R_{p,i}^b R_{p',i}^{p,i} \left((-1)^{i-1} c_d T_i\right) \end{bmatrix},$$

which can be organized into the following matrix form:

$$\begin{bmatrix} {}^b f_v \\ \tau \end{bmatrix} = A(\alpha) N;$$

where:

$\alpha=[\alpha_1, \alpha_2, \alpha_3, \alpha_4]^T$ represents tilt angles of four rotor assemblies;

$$N = \left[n_1^2, n_2^2, n_3^2, n_4^2\right]^T$$

represents square of rotor speeds of the four rotor assemblies; and $A(\alpha)$ is a trigonometric function matrix related to a tilt angle $\alpha_i$ of the rotor assembly.

In an embodiment, the tilt angle of the rotor assembly and the rotor speed have the following physical constraints:

$$\begin{cases} \underline{\alpha} \le \alpha_i \le \overline{\alpha} \\ \underline{n} \le n_i \le \overline{n} \end{cases};$$

where:

$\underline{\alpha}$, $\overline{\alpha}$, $\underline{n}$, $\overline{n}$ represent feasible physical upper and lower boundaries thereof.

Virtual control variables $N_{l,i}$ and $N_{v,i}$ are defined as follows:

$$\begin{aligned} N_{l,i} &= |N_{l,i}| = T_i s(\alpha_i) = c_T n_i^2 s(\alpha_i) \\ N_{v,i} &= |N_{v,i}| = T_i c(\alpha_i) = c_T n_i^2 c(\alpha_i) \end{aligned};$$

a relationship among the virtual control variables, the control force and the control torque is expressed as follows:

$$\begin{bmatrix} {}^b f_v \\ \tau \end{bmatrix} = \overline{A}\,\overline{N};$$

where:

$\overline{N}=[N_{l,1}, N_{v,1}, N_{l,2}, N_{v,2}, N_{l,3}, N_{v,3}, N_{l,4}, N_{v,4}]$, A is a constant matrix.

After obtaining the virtual control variables $N_{l,i}$ and $N_{v,i}$, a tilt angle of a steering engine and a motor speed can be calculated.

In an embodiment, integrating the six-degree-of-freedom motion equation and the control efficiency model into a control model designed for a control system includes:

the established six-degree-of-freedom motion equation of the aircraft is modified as the following form:

$$\begin{cases}\dot{P} = v\\ \dot{v} = g + G_v\,{}^{b}f_v + d_v\\ \dot{\Omega} = G_\Omega\omega\\ \dot{\omega} = -J^{-1}\omega\times J\omega + J^{-1}G_a + J^{-1}\tau + d_\omega\end{cases};$$

where $G_v = \frac{1}{m}R_b^e$, $d_v = \frac{1}{m}\Delta f_v$, and $d_\omega = J^{-1}\Delta\tau$.

In addition, to achieve the control on the above model, the present disclosure provides a system for controlling position and attitude separation of a tiltable rotor aircraft, including a capability prediction module, a position control subsystem, a velocity control subsystem, an attitude angle control subsystem, an angular rate control subsystem, a control allocation module, and a tiltable rotor aircraft. After expected position and attitude commands are corrected by the capability prediction module, expected force and torque commands are output by various control subsystems, and after receiving the force and torque commands, the control allocation module is further configured to calculate actual control commands of the aircraft, such as a tilt angle of a rotor assembly and a rotor speed, thus controlling the tiltable rotor aircraft to perform the tracking of the expected position and attitude commands.

In an embodiment, a position tracking error is defined as:

$$e_p = P - P_c = [e_x, e_y, e_z]^T;$$

a performance function of the position control subsystem is defined as:

$$\rho_p = \mathrm{diag}\{\rho_x(t), \rho_y(t), \rho_z(t)\}$$

$$\rho_i(t) = \begin{cases}\left(\frac{T_i - t}{T_i}\right)^{\frac{1}{1-\lambda_i}}(\rho_{i,0} - \rho_{i,\infty}) + \rho_{i,\infty}, & 0 \le t \le T_i\\ \rho_{i,\infty}, & t > T_i\end{cases};$$

where i=x, y, z;

$T_i$ represents convergence time set by a user;

$\lambda_i \in (0,1)$, $\rho_{i,0}$ and $\rho_{i,\infty}$ represent an initial value and a steady-state value of the performance function, respectively.

A relationship between the position tracking error and the performance function is as follows:

$$-\underline{b}_i\rho_i(t) < e_i(t) < \overline{b}_i\rho_i(t);$$

wherein $\underline{b}_i$, $\overline{b}_i \in (0,1]$;

the following conversion error $\gamma_p$ is defined as:

$$\gamma_p = \frac{1}{2}\left[\ln\frac{\vartheta_x(t) + \underline{b}_x}{\overline{b}_x - \vartheta_x(t)}, \ln\frac{\vartheta_y(t) + \underline{b}_y}{\overline{b}_y - \vartheta_y(t)}, \ln\frac{\vartheta_z(t) + \underline{b}_z}{\overline{b}_z - \vartheta_z(t)}\right]^T$$
$$\gamma_i(t) = \pi(\vartheta_i(t)) = \frac{1}{2}\ln\left(\frac{\vartheta_i(t) + \underline{b}_i}{\overline{b}_i - \vartheta_i(t)}\right), \vartheta_i(t) = \frac{e_i(t)}{\rho_i(t)};$$

where $\vartheta_i(t) \in (\underline{b}_i, \overline{b}_i)$ represents a normalization error.

based on the conversion error $\gamma_p$, guaranteed performance control law of the position control subsystem is:

$$\overline{v} = -k_p\gamma_p + \dot{P}_d + \sigma_p;$$

where:

$$\sigma_p = \left[e_x\dot{\rho}_x/\rho_x, e_y\dot{\rho}_y/\rho_y, e_z\dot{\rho}_z/\rho_z\right]^T;$$

$k_p$ represents a control gain.

a conversion error $\gamma_\Omega$ of the attitude angle control subsystem is defined as:

$$\gamma_\Omega = \frac{1}{2}\left[\ln\frac{\vartheta_\phi(t) + \underline{b}_\phi}{\overline{b}_\phi - \vartheta_\phi(t)}, \ln\frac{\vartheta_\theta(t) + \underline{b}_\theta}{\overline{b}_\theta - \vartheta_\theta(t)}, \ln\frac{\vartheta_\psi(t) + \underline{b}_\psi}{\overline{b}_\psi - \vartheta_\psi(t)}\right]^T;$$

the control law of the attitude angle control subsystem is:

$$\overline{\omega} = -k_\Omega\gamma_\Omega + \dot{\Omega}_d + \sigma_\Omega;$$

where:

$$\sigma_\Omega = \left[e_\phi\dot{\rho}_\phi/\rho_\phi, e_\theta\dot{\rho}_\theta/\rho_\theta, e_\psi\dot{\rho}_\psi/\rho_\psi\right]^T;$$

$k_\Omega$ represents a control gain.

In an embodiment, a first-order filter is configured to acquire a smooth signal $v_c$ and a differential signal $\dot{v}_c$ of an expected velocity command $\overline{v}$; and the lumped disturbance force of the velocity control subsystem is estimated by a disturbance observer:

$$\begin{cases}\tilde{e}_v = \hat{v} - v\\ \dot{\hat{v}} = g + \frac{1}{m}f_v - k_{v1}\theta sig^{\frac{1}{2}}(\tilde{e}_v) - \mu_{v1}(1-\theta)sig^{\frac{2+\alpha_v}{2}}(\tilde{e}_v) + \hat{d}_v\\ \dot{\hat{d}}_v = -k_{v2}\theta\,\mathrm{sign}(\tilde{e}_v) - \mu_{v2}(1-\theta)sig^{1+\alpha_v}(\tilde{e}_v)\end{cases};$$

where:

$\tilde{e}_v$ represents an estimated error, $\hat{v}$ and $\hat{d}_v$ represent an estimated velocity and the lumped disturbance force, respectively;

$$\alpha_v, \mu_{v1}, \mu_{v2} > 0, k_{v1} = 1.5\overline{d}_v^{1/2}, k_{v2} = 1.1\overline{d}_v;$$

$\overline{d}_v$ represents an upper boundary of a change rate of the lumped disturbance force;

$$\theta = \begin{cases}0, & t \le T_{v,0}\\ 1, & \text{otherwise}\end{cases};$$

$T_{v,o}$ represent parameters of the disturbance observer.

The control law of the velocity control subsystem is:

$${}^{b}f_{v,c} = G_v^{-1}\left(-k_ve_v - g - \hat{d}_v + \dot{v}_c - \zeta_p\gamma_p\right);$$

where:

$e_v = v - v_c = [e_{vx}, e_{vy}, e_{vz}]^T$ represents a velocity tracking error; and $k_v$ represents a control gain.

The first-order filter is also configured to acquire a smooth signal $\omega_c$ and a differential signal $\dot{\omega}_c$ of an expected angular rate command $\overline{\omega}$;

the lumped disturbance torque of the angular rate control subsystem is estimated by the disturbance observer:

$$\begin{cases} \tilde{e}_\omega = \hat{\omega} - \omega \\ \dot{\hat{\omega}} = -J^{-1}\omega \times J\omega + J^{-1}G_a + J^{-1}\tau - \\ k_{\omega 1}\theta sig^{\frac{1}{2}}(\tilde{e}_\omega) - \mu_{\omega 1}(1-\theta)sig^{\frac{2+\alpha_\omega}{2}}(\tilde{e}_\omega) + \hat{d}_\omega \\ \dot{\hat{d}}_\omega = -k_{\omega 2}\theta \text{sign}(\tilde{e}_\omega) - \mu_{\omega 2}(1-\theta)sig^{1+\alpha_\omega}(\tilde{e}_\omega) \end{cases};$$

where:

$\tilde{e}_\omega$ represents an estimated error;

$\hat{\omega}$ and $\hat{d}_\omega$ represent an estimated angular rate and the lumped disturbance torque, respectively;

$$\alpha_\omega, \mu_{\omega 1}, \mu_{\omega 2} > 0, k_{\omega 1} = 1.5\bar{d}_\omega^{1/2}, k_{\omega 2} = 1.1\bar{d}_\omega;$$

and $\bar{d}_\omega$ represents an upper boundary of a change rate of the lumped disturbance torque;

$$\theta = \begin{cases} 0, & t \le T_{\omega,o} \\ 1, & \text{otherwise} \end{cases};$$

$T_{\omega,o}$ represent parameters of the disturbance observer.

The control law of the angular rate control subsystem is:

$$\tau_c = G_\omega^{-1}\left(-k_\omega e_\omega + J^{-1}\omega \times J\omega - J^{-1}G_a - \hat{d}_\omega + \dot{\omega}_c - \zeta_\Omega \gamma_\Omega\right);$$

where:

$e_\omega = \omega - \omega_c = [e_p, e_q, e_r]^T$ represents an angular rate tracking error; and $k_\omega$ represents a control gain.

In an embodiment, according to the expected force and torque given by the velocity control subsystem and the angular rate control subsystem, a virtual control variable is calculated by means of pseudo-inverse control allocation:

$$\bar{N} = \bar{A}^{-1}\begin{bmatrix} {}^b f_v \\ \tau \end{bmatrix};$$

after obtaining the virtual control variable $\bar{N}$, a rotor tilt angle of and a rotor speed can be calculated.

The present disclosure can achieve the following beneficial effects: the embodiment of the present disclosure provides a practical method for controlling position and attitude separation, which can simultaneously ensure that errors of the position and attitude angle commands are limited in a pre-designed performance envelope, and a higher control performance can be obtained. Moreover, the expected command can be corrected by the capacity prediction module, the module, by considering the actual control capacity of the aircraft system, can correct the command beyond the control capacity range at an upper level, thus effectively avoiding a catastrophic consequence such as controller instability caused by control saturation and other problems.

REFERENCE NUMERALS

1 to 4—rotor; 102—geodetic coordinate system; 103—fixed coordinate system of propeller disc; and 104—comoving coordinate system of propeller disc.

The implementation, functional characteristics and advantages of the present disclosure will be further described with reference to the accompanying drawings in conjunction with embodiments.

DETAILED DESCRIPTION OF THE EMBODIMENTS

It should be understood that specific embodiments described here are only used to illustrate rather than limiting the present disclosure.

Figure 1:
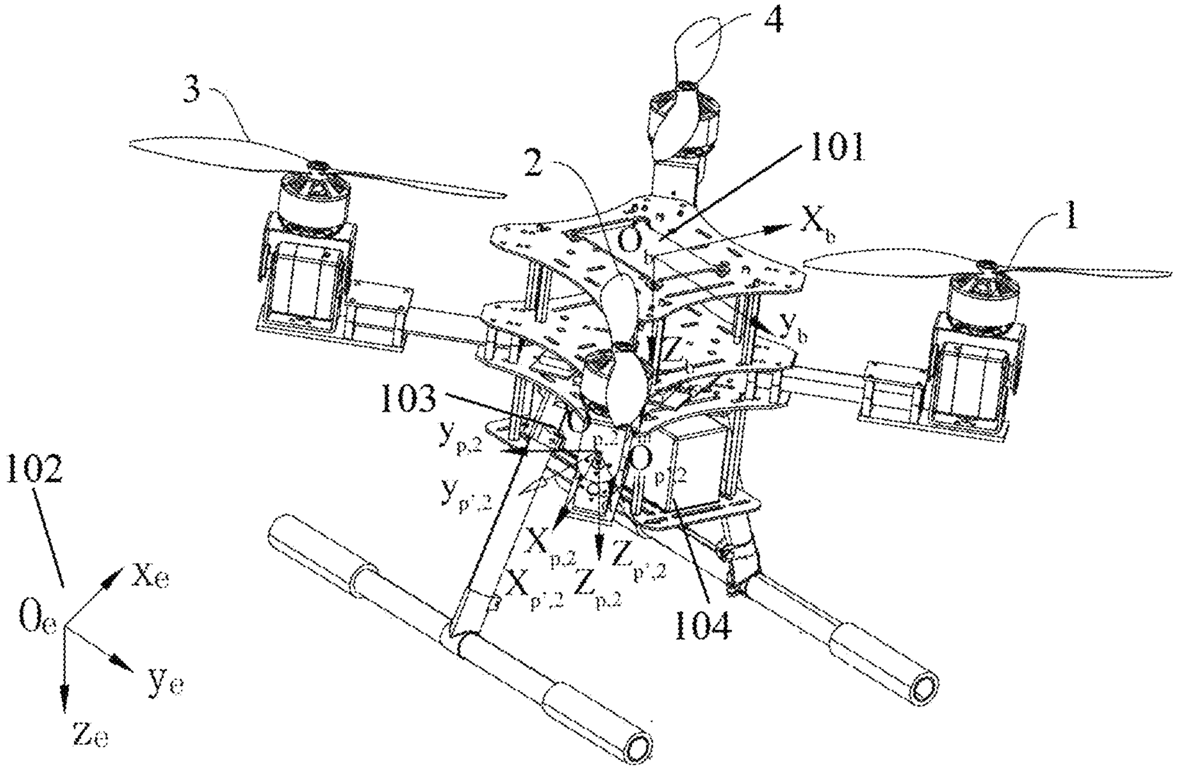
FIG. 1 is a schematic diagram of an aircraft.
Figure 2:
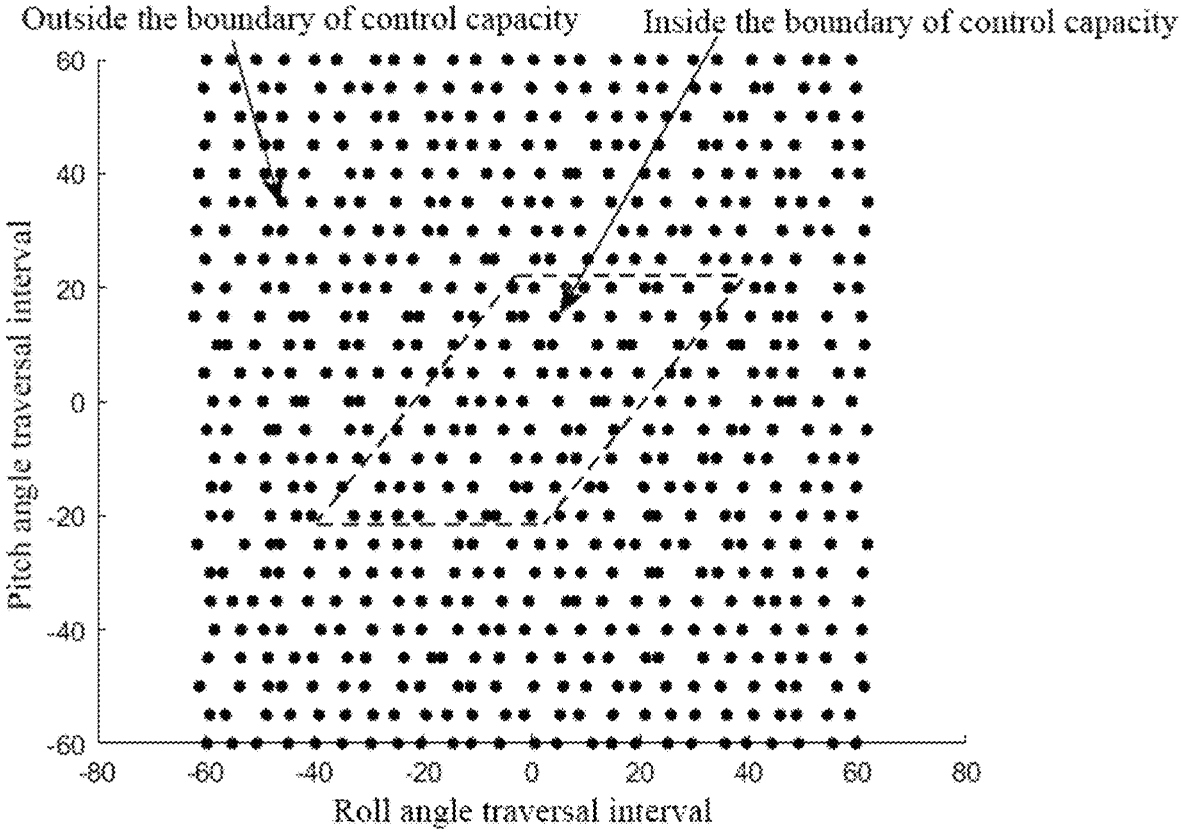
FIG. 2 is a schematic diagram of a boundary of control capacity according to the present disclosure.
Figure 3:
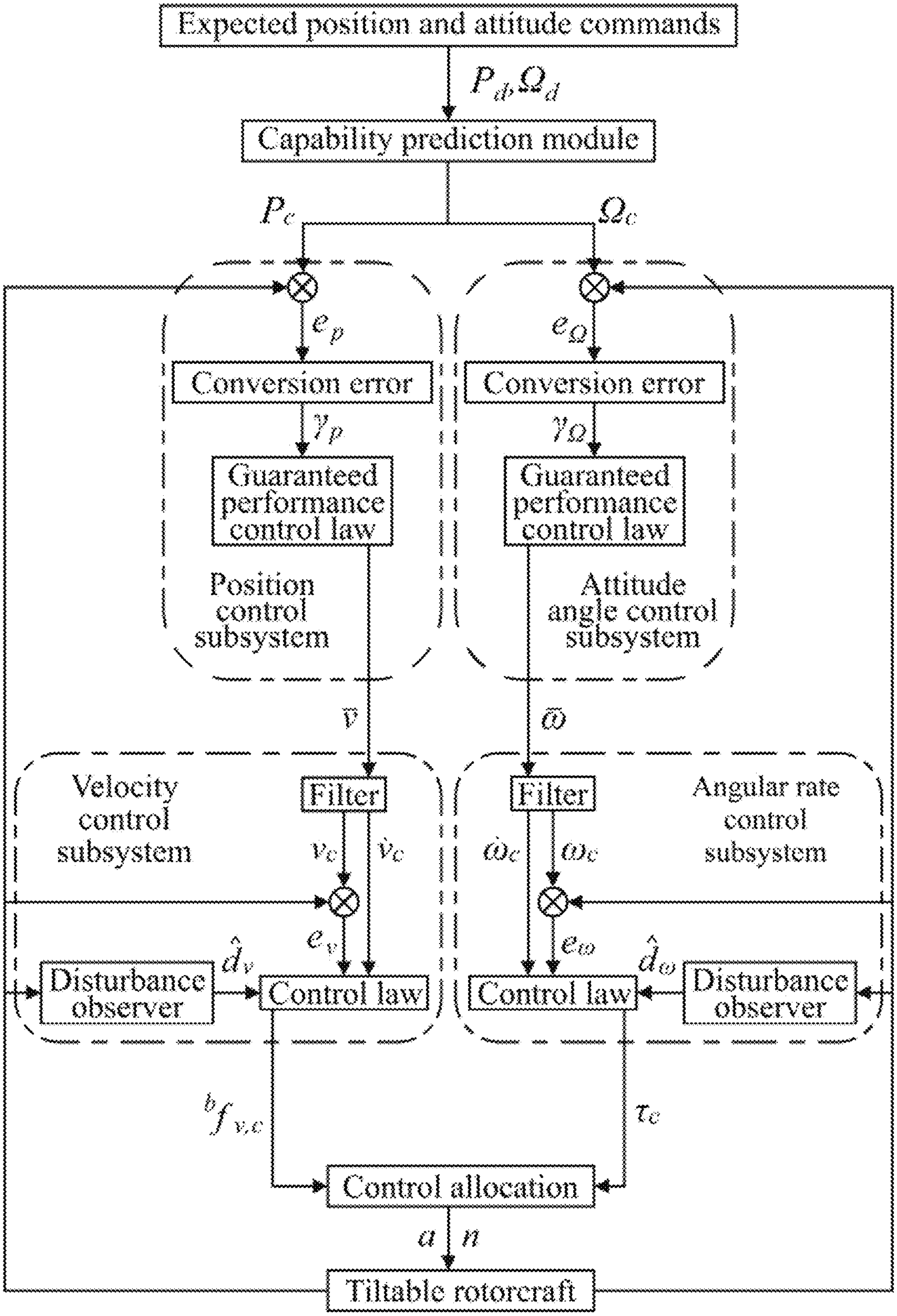
FIG. 3 is a schematic diagram of a position and attitude separation control system according to the present disclosure.

Referring to FIG. 1-FIG. 3, the present disclosure provides a system for controlling position and attitude separation of a tiltable rotorcraft, including:

a capability prediction module, a position control subsystem, a velocity control subsystem, an attitude angle control subsystem, an angular rate control subsystem, a control allocation module, and a tiltable rotorcraft. The capacity prediction module is configured to correct expected position and attitude commands, expected force and torque commands are output by the position control subsystem, the velocity control subsystem, the attitude angle control subsystem and the angular rate control subsystem. After receiving the force and torque commands, the control allocation module is further configured to calculate actual control commands of the aircraft, such as a tilt angle of a rotor assembly and a rotor speed, thus controlling the tiltable rotorcraft to perform the tracking of the expected position and attitude commands.

The method for controlling position and attitude separation of a tiltable rotorcraft including:

establishing six-degree-of-freedom motion equations of translational motion of the center-of-mass and rotation around the center-of-mass of the tiltable rotorcraft;

establishing a control efficiency model of the tiltable rotorcraft;

integrating the six-degree-of-freedom motion equations and the control efficiency model into a control model designed for a control system; and establishing a capability prediction model according to the control model, and outputting a position and attitude angle correction command through the capability prediction model.

A position control subsystem, a velocity control subsystem, an attitude angle control subsystem, an angular rate control subsystem and a control allocation module are constructed according to the control model, and an actual control command (a tilt angle of a rotor assembly and a rotor speed) of an aircraft is output according to a correction command given by the capability prediction model.

Therefore, a practical method for controlling position and attitude separation is provided in the present disclosure, which can simultaneously ensure that errors of the position and attitude angle commands are limited in a pre-designed performance envelope, and a higher control performance can be obtained. Moreover, the expected command can be corrected by the capacity prediction module, which, by considering the actual control capacity of the aircraft system, can correct the command beyond the control capacity range at an upper level, thus effectively avoiding a catastrophic consequence such as controller instability caused by control saturation and other problems.

Specifically, the schematic diagram of an aircraft, the definition of a coordinate system and the serial number of a rotor assembly can refer to FIG. 1.

A kinematic equation of the translational motion of the center-of-mass can be established as:

$$\dot{P} = v;$$

where:

$P=[x, y, z]^T$ represents three-axis positions of the aircraft;

$v=[v_x, v_y, v_z]^T$ represents three-axis velocity of the aircraft;

the dynamic equation of the translational motion of the center-of-mass can be expressed as:

$$m\dot{v} = mg + f_v + \Delta f_v;$$

where:

m represents a mass of the aircraft;

$g=[0, 0, g]^T$ represents a gravitational acceleration vector;

$\Delta f_v$ represents a lumped force disturbance;

where $f_v$ represents a control force, which is defined as:

$$f_v = R_b^e \ {}^b f_v = R_b^e \sum_{i=1}^{4} R_{p,i}^b R_{p',i}^{p,i} T_i;$$

where:

$${}^b f_v = R_b^e \sum_{i=1}^{4} R_{p,i}^b R_{p',i}^{p,i} T_i$$

represents a resultant force in a body coordinate system of the aircraft;

$T_i=[0, 0, -T_i]^T$ represents a rotor thrust of an $i^{th}$ rotor;

$$T_i = c_T n_i^2,\ c_T$$

represents a thrust coefficient;

$n_i$ represents a rotor speed of the it rotor; and $$R_b^e,\ R_{p,i}^b,\ R_{p',i}^{p,i}$$

represent a conversion relationship from the body coordinate system to a geodetic coordinate system, a conversion relationship from a fixed coordinate system of a propeller disc of the $i^{th}$ rotor to the body coordinate system, and a conversion relationship from a comoving coordinate system of the propeller disc of the $i^{th}$ rotor to the fixed coordinate system of the propeller disc, respectively.

A kinematic equation of the rotation around of the center-of-mass can be established as:

$$\dot{\Omega} = G_w \omega;$$

where:

$\Omega=[\phi, \theta, \psi]^T$ represents an attitude angle of the aircraft;

$\phi$, $\theta$, $\psi$ represent a roll angle, a pitch angle and a yaw angle, respectively;

$\omega=[p, q, r]^T$ represents an angular rate of the aircraft; and p, q, r represents a roll angular rate, a pitch angular rate and a yaw angular rate, respectively;

a matrix $G_W$ is defined as:

$$G_w = \begin{bmatrix} 1 & \tan\theta\sin\phi & \tan\theta\cos\phi \\ 0 & \cos\phi & -\sin\phi \\ 0 & \sin\phi/\cos\theta & \cos\phi/\cos\theta \end{bmatrix};$$

according to Euler's dynamic equation, the dynamic equation of the rotation around of the center-of-mass is:

$$J\dot{\omega} + \omega \times J\omega = G_a + \tau + \Delta\tau;$$

where:

$J=\mathrm{diag}\{J_{xx}, J_{yy}, J_{zz}\}$ represents an inertia tensor matrix;

$G_a$ represents a gyroscopic torque;

$\tau$ represents a triaxial torque (also called a control torque) generated by a propeller; and $\Delta\tau$ represents a lumped torque disturbance.

a control torque $\tau$ is defined as:

$$\tau = \tau_r + \tau_d.$$

Where:

$$\tau_t = \sum_{i=1}^{4} \left( {}^b O_{p,i} \times R_{p,i}^b R_{p',i}^{p,i} T_i \right)$$

represents a torque generated by four rotor thrusts;

$$\tau_d = \sum_{i=1}^{4} R_{p,i}^b R_{p',i}^{p,i} \left( (-1)^{i-1} c_M n_i^2 \right)$$

represents a torque formed by a reaction torque for the rotor;

${}^{b}O_{p,i}$ represents a position of an origin of the fixed coordinate system of the propeller disc in the body coordinate system;

$$ {}^{b}O_{p,i} = R_b^{p,i} l; $$

$l=[1, 0, 0]^T$ represents a length of an arm; and $c_M$ represents a coefficient of the reaction torque.

In addition, according to equations of the control force $f_v$ and the control torque $\tau$, the following can be obtained:

$$ \begin{bmatrix} {}^{b}f_v \\ \tau \end{bmatrix} = \begin{bmatrix} \sum_{i=1}^{4} R_{p,i}^{b} R_{p',i}^{p,i} T_i \\ \sum_{i=1}^{4} \left( {}^{b}O_{p,i} \times R_{p,i}^{b} R_{p',i}^{p,i} T_i \right) + \sum_{i=1}^{4} R_{p,i}^{b} R_{p',i}^{p,i} \left( (-1)^{i-1} c_d T_i \right) \end{bmatrix}, $$

which can be organized into the following matrix form:

$$ \begin{bmatrix} {}^{b}f_v \\ \tau \end{bmatrix} = A(\alpha) N; $$

where:

$\alpha=[\alpha_1, \alpha_2, \alpha_3, \alpha_4]^T$ represents tilt angles of four rotor assemblies;

$$ N = \left[ n_1^2, n_2^2, n_3^2, n_4^2 \right]^T $$

represents the square of rotor speeds of four rotor assemblies; and $A(\alpha)$ is a trigonometric function matrix related to a tilt angle di of the rotor assembly.

Considering the actual condition, the tilt angle of the rotor assembly and the rotor speed have the following physical constraints:

$$ \begin{cases} \underline{\alpha} \le \alpha_i \le \overline{\alpha} \\ \underline{n} \le n_i \le \overline{n} \end{cases}; $$

where:

$\underline{\alpha}$, $\overline{\alpha}$, $\underline{n}$, $\overline{n}$ represent feasible physical upper and lower boundaries thereof.

The control force, the control torque and a virtual control variable (the tilt angle of the rotor assembly and the rotor speed) are non-affine, to avoid the non-affine control allocation problem, virtual control variables $N_{l,i}$ and $N_{v,i}$ are defined as follows:

$$ \begin{aligned} N_{l,i} &= |N_{l,i}| = T_i s(\alpha_i) = c_T n_i^2 s(\alpha_i) \\ N_{v,i} &= |N_{v,i}| = T_i c(\alpha_i) = c_T n_i^2 c(\alpha_i) \end{aligned}; $$

a relationship among the virtual control variables, the control force and the control torque can be expressed as follows:

$$ \begin{bmatrix} {}^{b}f_v \\ \tau \end{bmatrix} = \overline{A} \overline{N}; $$

where:

$\overline{N}=[N_{l,1}, N_{v,1}, N_{l,2}, N_{v,2}, N_{l,3}, N_{v,3}, N_{l,4}, N_{v,4}]$, $\overline{A}$ is a constant matrix.

After obtaining the virtual control variables $N_{l,i}$ and $N_{v,i}$, a tilt angle of a steering engine and a motor speed can be calculated.

In an embodiment, to facilitate the design of a controller, the six-degree-of-freedom motion equations and the control efficiency model are integrated into a control model designed for a control system, including:

the established six-degree-of-freedom motion equation of the aircraft is modified as the following form:

$$ \begin{cases} \dot{P} = v \\ \dot{v} = g + G_v {}^{b}f_v + d_v \\ \dot{\Omega} = G_\Omega \omega \\ \dot{\omega} = -J^{-1}\omega \times J\omega + J^{-1} G_a + J^{-1}\tau + d_\omega \end{cases}; $$

where $G_v = \frac{1}{m} R_b^e$, $d_v = \frac{1}{m} \Delta f_v$, and $d_\omega = J^{-1} \Delta \tau$.

Considering that the control capability of the aircraft is limited due to the physical constraints of an actuator (the tilt angle and the rotor speed), not all arbitrary position and attitude commands can be tracked, and thus an aircraft capability prediction module based on deep learning is designed in the present disclosure.

Taking the calculation of an attitude angle constraint boundary as an example, a control capability constraint value can be calculated by optimizing the following formula:

$$ \max \pm x,\ x = \theta, \phi, \varphi $$

$$ \text{s.t.} \begin{cases} \dot{v} = g - R_b^e f_b / m + d_f \\ \dot{\omega} = -J^{-1}\omega \times J\omega + J^{-1} G_a + J^{-1}\tau + d_\tau \\ v = v^* \text{ or } \Omega = \Omega^* \\ \alpha \in (\underline{\alpha}, \overline{\alpha}) \\ N \in (\underline{N}, \overline{N}) \end{cases}; $$

however, it is extremely time-consuming to solve the above optimization problems online, and an on-board chip is difficult to be applied to each control cycle due to its limited computing performance. To solve this problem, a strategy of "off-line optimization and deep network fitting and online application" is adopted in the present disclosure, and thus an aircraft capability prediction module based on deep learning is proposed.

Specifically, first of all, in the possible working conditions of the aircraft, the above optimization problems are solved by traversal, and calculation conditions v for each optimization problem and upper and lower values of the optimization results θ, ϕ, φ are saved (FIG. 2 shows a schematic diagram of a controllable boundary of an attitude angle during hovering). Then, the calculation conditions and the optimization results are used as an input and label values of the network respectively for network training. Finally, the online application can be performed after the training is completed.

The aircraft capability prediction module based on deep learning can correct the position and attitude angle commands according to the prediction results in each control cycle, and provided the control system with the expected command that meet the control capability thereof, thus avoiding a series of problems such as instability caused by limited control capability of the aircraft.

In the above embodiment, the guaranteed performance position and attitude separation control method is designed by the position control subsystem, the velocity control subsystem, the attitude angle control subsystem, and the angular rate control subsystem.

The position control subsystem is designed as follows:

a position tracking error is defined as:

$$e_p = P - P_c = [e_x, e_y, e_z]^T;$$

a performance function of the position control subsystem is defined as:

$$\rho_p = \mathrm{diag}\{\rho_x(t), \rho_y(t), \rho_z(t)\}$$

$$\rho_i(t) = \begin{cases} \left(\frac{T_i - t}{T_i}\right)^{\frac{1}{1-\lambda_i}}(\rho_{i,0} - \rho_{i,\infty}) + \rho_{i,\infty}, & 0 \le t \le T_i \\ \rho_{i,\infty}, & t > T_i \end{cases};$$

where i=x, y, z;

$T_i$ represents convergence time set by a user;

$\lambda_i \in (0,1)$, $\rho_{i,0}$ and $\rho_{i,\infty}$ represent an initial value and a steady-state value of the performance function, respectively.

A relationship between the position tracking error and the performance function is as follows:

$$-\underline{b}_i \rho_i(t) < e_i(t) < \overline{b}_i \rho_i(t);$$

wherein $\underline{b}_i$, $\overline{b}_i \in (0,1]$;

the attitude angle control subsystem is designed as follows:

the following conversion error $\gamma_p$ is defined as:

$$\gamma_p = \frac{1}{2}\left[\ln\frac{\vartheta_x(t) + \underline{b}_x}{\overline{b}_x - \vartheta_x(t)}, \ln\frac{\vartheta_y(t) + \underline{b}_y}{\overline{b}_y - \vartheta_y(t)}, \ln\frac{\vartheta_z(t) + \underline{b}_z}{\overline{b}_z - \vartheta_z(t)}\right]^T$$

$$\gamma_i(t) = \pi(\vartheta_i(t)) = \frac{1}{2}\ln\left(\frac{\vartheta_i(t) + \underline{b}_i}{\overline{b}_i - \vartheta_i(t)}\right), \vartheta_i(t) = \frac{e_i(t)}{\rho_i(t)},;$$

where $\vartheta_i(t) \in (\underline{b}_i, \overline{b}_i)$ represents a normalization error.

based on a conversion error $\gamma_p$, the guaranteed performance control law is:

$$\overline{v} = -k_p \gamma_p + \dot{P}_d + \sigma_p;$$

where:

$\sigma_p = [e_x \dot{\rho}_x/\rho_x,\ e_y \dot{\rho}_y/\rho_y,\ e_z \dot{\rho}_z/\rho_z]^T$; and $k_p$ represents a control gain.

a conversion error $\gamma_\Omega$ of the attitude angle control subsystem is defined as:

$$\gamma_\Omega = \frac{1}{2}\left[\ln\frac{\vartheta_\phi(t) + \underline{b}_\phi}{\overline{b}_\phi - \vartheta_\phi(t)}, \ln\frac{\vartheta_\theta(t) + \underline{b}_\theta}{\overline{b}_\theta - \vartheta_\theta(t)}, \ln\frac{\vartheta_\psi(t) + \underline{b}_\psi}{\overline{b}_\psi - \vartheta_\psi(t)}\right]^T;$$

the control law of the attitude angle control subsystem is:

$$\overline{\omega} = -k_\Omega \gamma_\Omega + \dot{\Omega}_d + \sigma_\Omega;$$

where:

$$\sigma_\Omega = [e_\phi \dot{\rho}_\phi/\rho_\phi, e_\theta \dot{\rho}_\theta/\rho_\theta, e_\psi \dot{\rho}_\psi/\rho_\psi]^T;$$

and $k_\Omega$ represents a control gain.

The velocity control subsystem is designed as follows:

to avoid a differential explosion phenomenon, the first-order filter is configured to acquire a smooth signal $v_c$ and a differential signal $\dot{v}_c$ of an expected velocity command $\overline{v}$; and;

the lumped disturbance force of the velocity control subsystem is estimated by an disturbance observer:

$$\begin{cases} \tilde{e}_v = \hat{v} - v \\ \dot{\hat{v}} = g + \frac{1}{m}f_v - k_{v1}\theta\, sig^{\frac{1}{2}}(\tilde{e}_v) - \mu_{v1}(1-\theta)sig^{\frac{2+\alpha_v}{2}}(\tilde{e}_v) + \hat{d}_v \\ \dot{\hat{d}}_v = -k_{v2}\theta \mathrm{sign}(\tilde{e}_v) - \mu_{v2}(1-\theta)sig^{1+\alpha_v}(\tilde{e}_v) \end{cases};$$

where:

$\tilde{e}_v$ represents an estimated error;

$\hat{v}$ and $\hat{d}_v$ represent an estimated velocity and the lumped disturbance force, respectively;

$$\alpha_v, \mu_{v1}, \mu_{v2} > 0, k_{v1} = 1.5\overline{d}_v^{1/2}, k_{v2} = 1.1\overline{d}_v;$$

$\overline{d}_v$ represents an upper boundary of a change rate of the lumped disturbance force;

$$\theta = \begin{cases} 0, & t \le T_{v,0} \\ 1, & \text{otherwise} \end{cases};$$

$T_{v,o}$ represent parameters of the disturbance observer.

The control law of the velocity control subsystem is:

$${}^b f_{v,c} = G_v^{-1}(-k_v e_v - g - \hat{d}_v + \dot{v}_c - \zeta_p \gamma_p);$$

where:

$e_v = v - v_c = [e_{vx}, e_{vy}, e_{vz}]^T$ represents a velocity tracking error; and $k_v$ represents a control gain.

The angular rate control subsystem is designed as follows:

the first-order filter is also configured to acquire a smooth signal $\omega_c$ and a differential signal $\dot{\omega}_c$ of an expected angular rate command $\overline{\omega}$;

the lumped disturbance torque of the angular rate control subsystem is estimated by the disturbance observer:

$$\begin{cases} \tilde{e}_\omega = \hat{\omega} - \omega \\ \dot{\hat{\omega}} = -J^{-1}\omega \times J\omega + J^{-1}G_a + J^{-1}\tau - \\ k_{\omega 1}\theta\, sig^{\frac{1}{2}}(\tilde{e}_\omega) - \mu_{\omega 1}(1-\theta)sig^{\frac{2+\alpha_\omega}{2}}(\tilde{e}_\omega) + \hat{d}_\omega \\ \dot{\hat{d}}_\omega = -k_{\omega 2}\theta\,\text{sign}(\tilde{e}_\omega) - \mu_{\omega 2}(1-\theta)sig^{1+\alpha_\omega}(\tilde{e}_\omega) \end{cases};$$

where:

$\tilde{e}_\omega$ represents an estimated error;

$\hat{\omega}$ and $\hat{d}_\omega$ represent an estimated angular rate and the lumped disturbance torque, respectively;

$$\alpha_\omega, \mu_{\omega 1}, \mu_{\omega 2} > 0, k_{\omega 1} = 1.5\bar{d}_\omega^{1/2}, k_{\omega 2} = 1.1\bar{d}_\omega;$$

$\bar{d}_\omega$ represents an upper boundary of a change rate of the lumped disturbance torque;

$$\theta = \begin{cases} 0, & t \le T_{\omega,0} \\ 1, & \text{otherwise} \end{cases};$$

$T_{\omega,o}$ represent parameters of the disturbance observer. The control law of the angular rate control subsystem is:

$$\tau_c = G_\omega^{-1}\left(-k_\omega e_\omega + J^{-1}\omega \times J\omega - J^{-1}G_a - \hat{d}_\omega + \dot{\omega}_c - \zeta_\Omega \gamma_\Omega\right);$$

where:

$e_\omega = \omega - \omega_c = [e_p, e_q, e_r]^T$ represents an angular rate tracking error; and $k_\omega$ represents a control gain.

Further, according to the expected force and torque given by the velocity control subsystem and the angular rate control subsystem, a virtual control variable is calculated by means of pseudo-inverse control allocation:

$$\bar{N} = \bar{A}^{-1}\begin{bmatrix} {}^b f_v \\ \tau \end{bmatrix};$$

after obtaining the virtual control variable $\bar{N}$, a tilt angle of a rotor assembly and a rotor speed can be calculated.

The present disclosure is simulated and tested in the following simulation examples: an initial position of the aircraft is P=[0.5 m, 0.3 m, 1 m]$^T$, an initial velocity is v=[0.2 m/s, 0.3 m/s, 0.1 m/s]$^T$, an initial attitude angle is Ω=[1°, 20°, −1.2°]$^T$, and an initial angular rate is ω=[0.2°/s, 0.3°/s, 0.1°/s]$^T$.

The position and attitude angle commands are:

$$P_d = \begin{bmatrix} \cos(0.5t) \\ \sin(0.5t) \\ 0.1t \end{bmatrix} m, \Omega_d = \begin{bmatrix} 0.3\cos(0.5t) \\ 0.3\sin(0.5t) \\ 0 \end{bmatrix} \text{rad}.$$

The disturbance force and the disturbance torque are set as:

$$\begin{cases} d_{vx} = \sin(0.4t) \\ d_{vy} = 1.2\sin(0.2t) \\ d_{vz} = 0.8\sin(0.2t) \end{cases}, \begin{cases} d_p = 0.5\sin(0.6t) \\ d_q = 0.6\sin(0.7t) \\ d_r = 0.4\sin(0.8t) \end{cases}.$$

Figure 4:
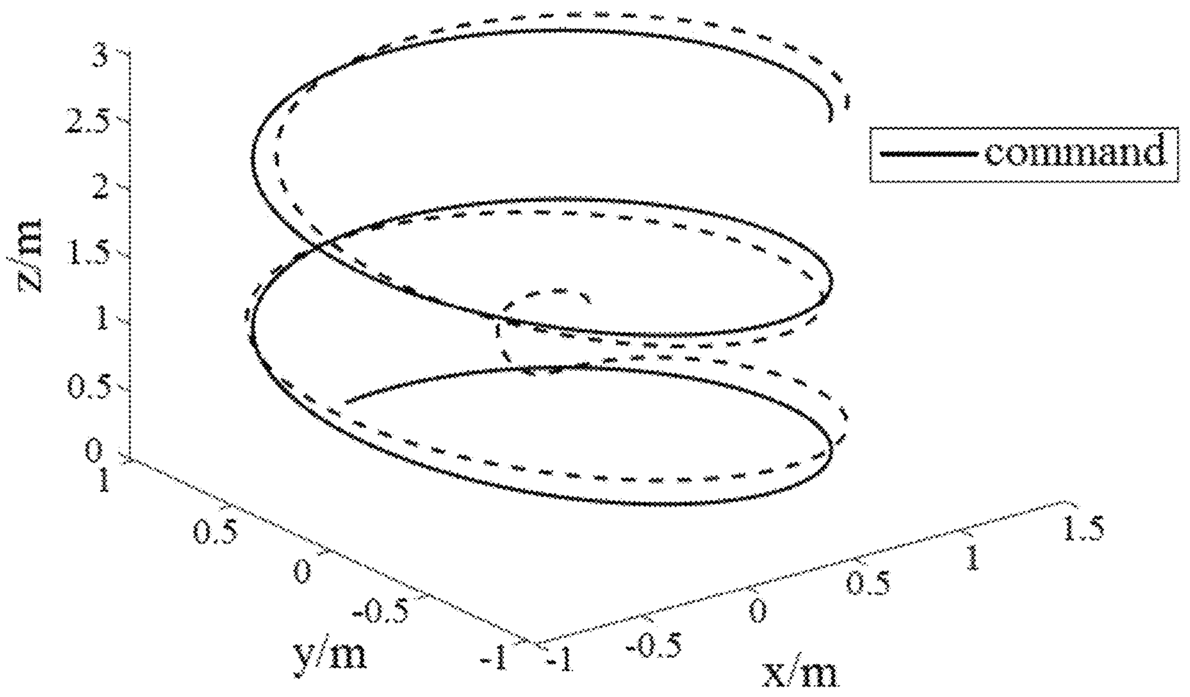
FIG. 4 is a schematic diagram of a position tracking effect curve according to the present disclosure.
Figure 5:
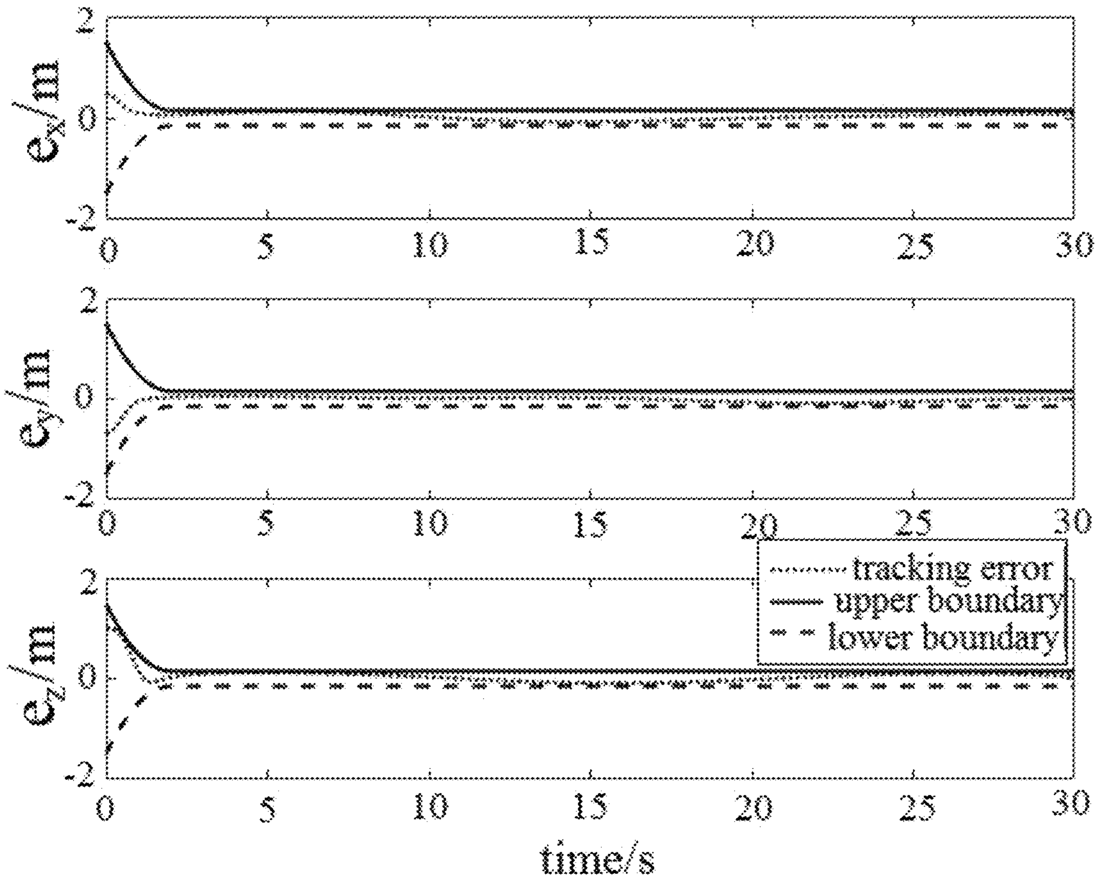
FIG. 5 is a schematic diagram of a position tracking error curve according to the present disclosure.
Figure 6:
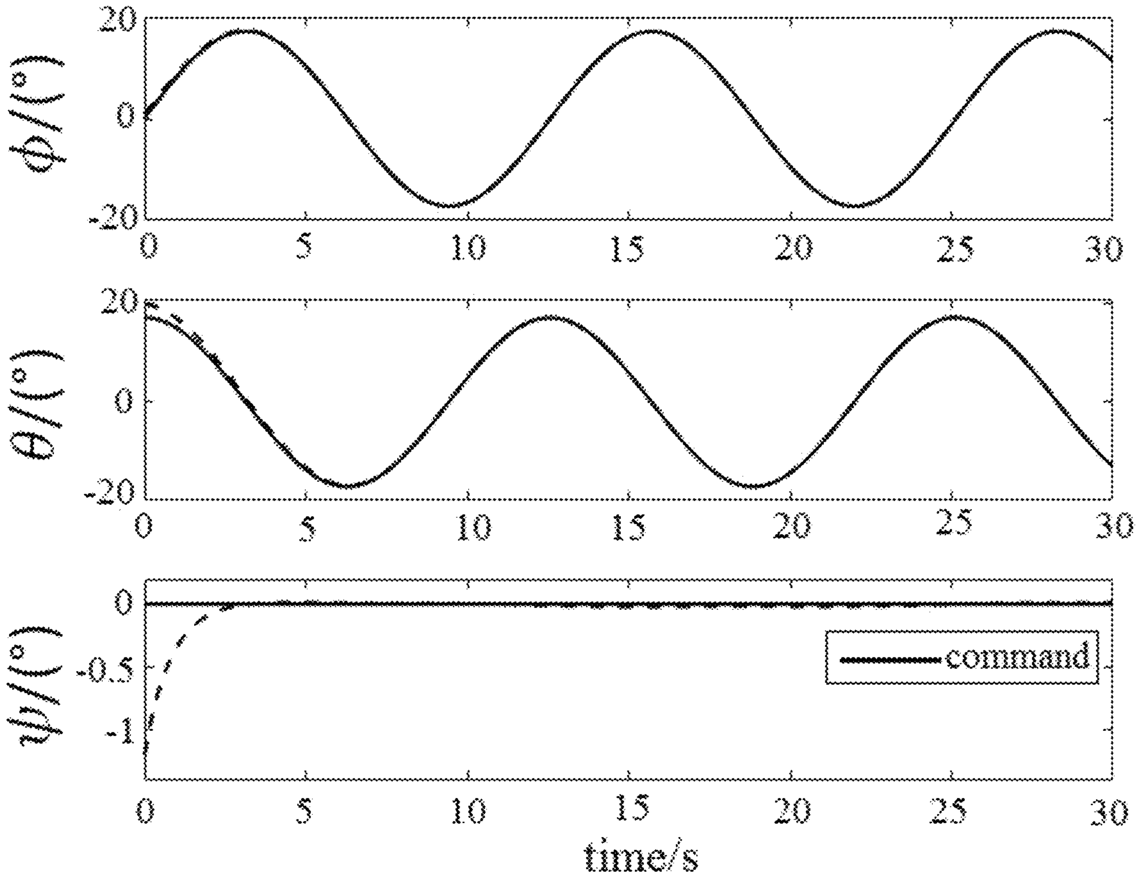
FIG. 6 is a schematic diagram of an attitude angle tracking effect curve according to the present disclosure.
Figure 7:
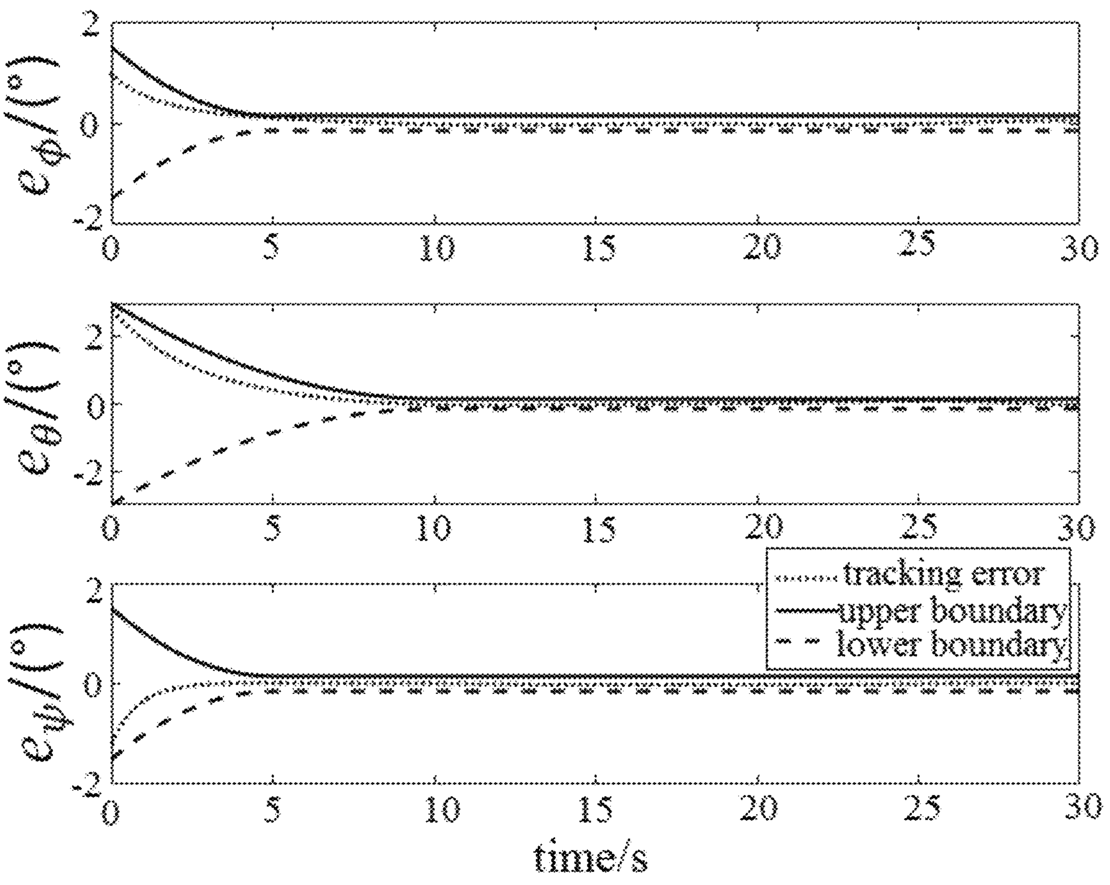
FIG. 7 is a schematic diagram of an attitude angle tracking error curve according to the present disclosure.
Figure 8A:
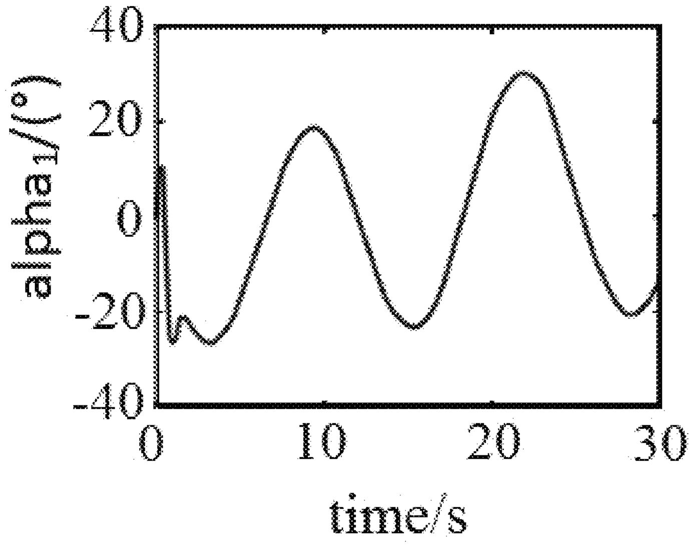
FIGS. 8A-D is a schematic diagram of a curve of a rotor tilt angle according to the present disclosure.
Figure 8B:
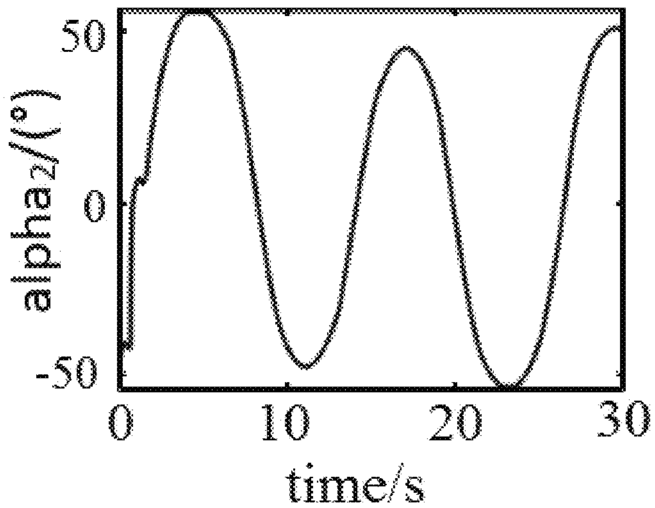
Figure 8C:
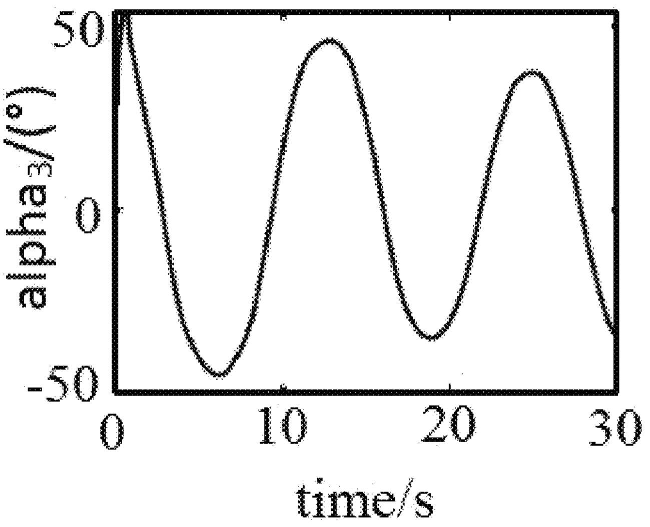
Figure 8D:
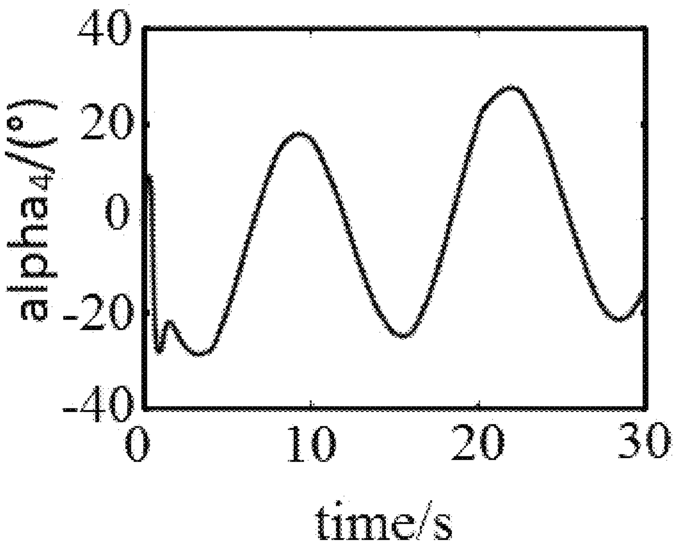
Figure 9A:
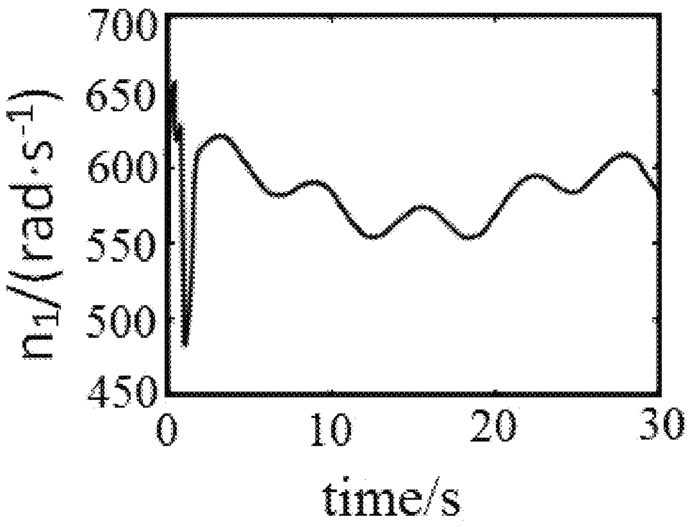
FIGS. 9A-D is a schematic diagram of a curve of a rotor speed according to the present disclosure.
Figure 9B:
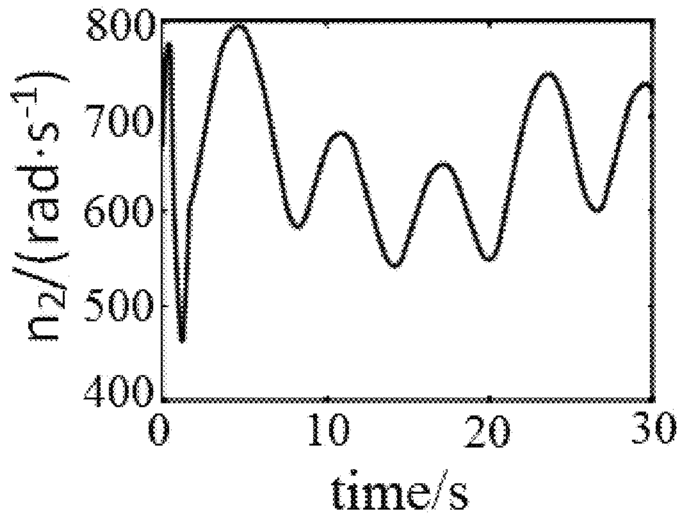
Figure 9C:
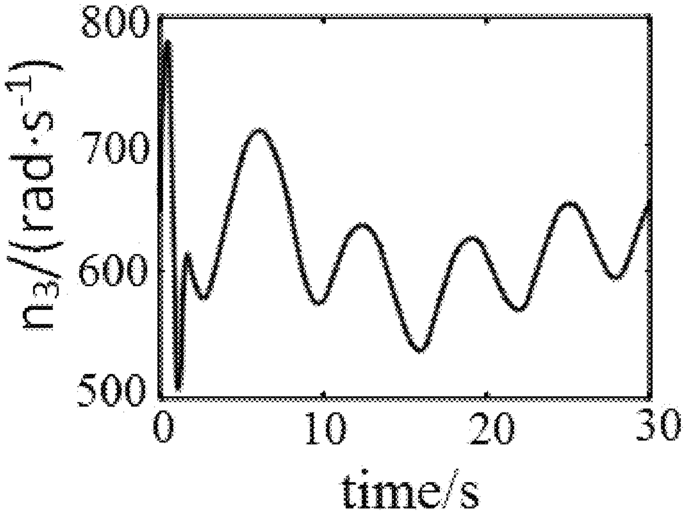
Figure 9D:
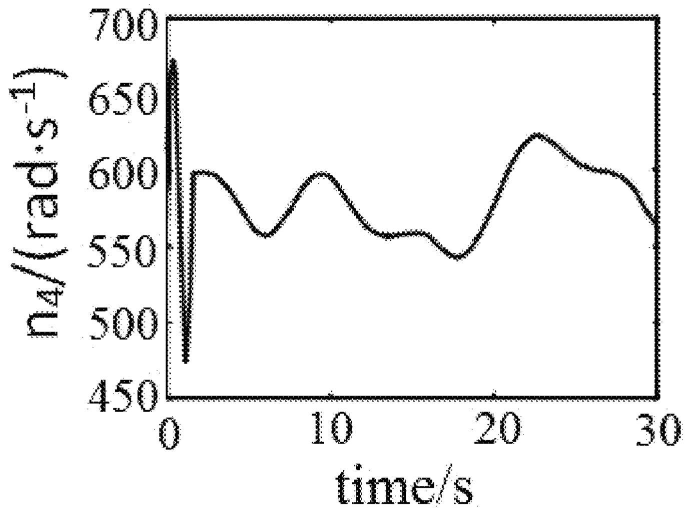

Referring to FIG. 4 to FIG. 9, a position tracking performance curve and a position tracking error curve shown in FIG. 4 and FIG. 5, an attitude angle tracking performance curve and an attitude angle tracking error curve shown in FIG. 6 and FIG. 7 can be found that the tracking error can be limited within the designed performance function boundary under the action of the designed method, and the aircraft can be better controlled. From the curves of the tilt angel of the rotor shown in FIGS. 8A-D and the curves of the rotor speed shown in FIGS. 9A-D, it can be found that the virtual control variable is smooth and within the feasible range.

Compared with the prior art, the method for controlling position and attitude separation of the tiltable rotorcraft provided by the present disclosure has the following advantages.

1. For a research object, i.e., a tiltable rotorcraft, a practical method for controlling position and attitude separation is proposed. Moreover, the proposed method can ensure that the errors of position and attitude angle commands are limited in the pre-designed performance envelope at the same time, and higher control performance can be obtained.
2. The expected command can be corrected by the capacity prediction module, the module, by considering the actual control capacity of the aircraft system, can correct the command beyond the control capacity range at an upper level, thus effectively avoiding a catastrophic consequence such as controller instability caused by control saturation and other problems.
3. The system has an open architecture and is composed of the capability prediction module, the first-order filter, the disturbance observer and the control law. The capability prediction module, the filter and the disturbance observer are not limited to the methods used here, and can be quickly replaced according to the actual task requirements on the premise of ensuring consistent interfaces.

In conclusion, the method for controlling position and attitude separation of a tiltable rotorcraft provided by the present disclosure has the advantages of high robustness and strong expansibility, which can be widely used in various practical task scenarios of the tiltable rotorcraft, and is a valuable and innovative research achievement.

Through the description of the above embodiments, those skilled in the art can clearly understand that above embodiment methods may be implemented by software and a necessary universal hardware platform. Certainly, the embodiment methods may also be implemented by hardware, but in many cases the former is a better implementation. Based on such an understanding, the essence of the technical solution, or the part contributing to the prior art, of the present disclosure may be implemented in the form of a software product. The software product may be stored in a storage medium (such as ROM (Read-only memory)/RAM (Random access memory), a magnetic disk, an optical disk), and include several commands for indicating a terminal device (which may be an aircraft, or a flight simulation computer) to execute all methods described in the embodiments of the present disclosure.

The above is only the preferred embodiment of the present disclosure and is not intended to limit the patent scope of the present disclosure. Any equivalent structure or equivalent flow transformation made by using the contents of this specification and accompanying drawings of the present disclosure, or directly or indirectly used in other related technical fields, are equally included in the patent protection scope of the present disclosure.

What is claimed is:

1. A method for controlling position and attitude separation control method of a tiltable rotorcraft, comprising:

establishing six-degree-of-freedom motion equations of translational motion of center-of-mass and rotation around the center-of-mass of the tilting rotorcraft;

establishing a control efficiency model of the tiltable rotorcraft;

integrating the six-degree-of-freedom motion equations and the control efficiency model into a control model designed for a control system;

establishing a capability prediction model according to the control model, and outputting a position and attitude angle correction command through the capability prediction model;

constructing a velocity control subsystem, an attitude angle control subsystem, an angular rate control subsystem and a control allocation module; and outputting an actual control command of an aircraft according to a correction command provided by the capability prediction model.

2. The method for controlling position and attitude separation of the tiltable rotorcraft according to claim 1, wherein a kinematic equation of the translational motion of the center-of-mass is established as follows:

$$\dot{P} = v;$$

wherein $P=[x, y, z]^T$ represents three-axis positions of the aircraft;

$v=[v_x, v_y, v_z]^T$ represents three-axis velocity of the aircraft;

the dynamic equation of the translational motion of the center-of-mass is expressed as:

$$m\dot{v} = mg + f_v + \Delta f_v;$$

wherein m represents a mass of the aircraft;

$g=[0, 0, g]^T$ represents a gravitational acceleration vector;

$\Delta f_v$ represents a lumped force disturbance;

wherein $f_v$ represents a control force, which is defined as:

$$f_v = R_b^e \; {}^b f_v = R_b^e \sum_{i=1}^{4} R_{p,i}^b R_{p',i}^{p,i} T_i;$$

wherein $${}^b f_v = R_b^e \sum_{i=1}^{4} R_{p,i}^b R_{p',i}^{p,i} T_i$$

represents a resultant force in a body coordinate system of the aircraft;

$T_i=[0, 0, -T_i]^T$ represents a rotor thrust of an $i^{th}$ rotor;

$$T_i = c_T n_i^2, c_T$$

represents a thrust coefficient;

$n_i$ represents a rotor speed of the $i^{th}$ rotor; and $$R_b^e, R_{p,i}^b, R_{p',i}^{p,i}$$

represent a conversion relationship from the body coordinate system to a geodetic coordinate system, a conversion relationship from a fixed coordinate system of a propeller disc of the $i^{th}$ rotor to the body coordinate system, and a conversion relationship from a comoving coordinate system of the propeller disc of the $i^{th}$ rotor to the fixed coordinate system of the propeller disc, respectively.

3. The method for controlling position and attitude separation control of the tiltable rotorcraft according to claim 2, wherein a kinematic equation of the rotation around the center-of-mass is established as follows:

$$\dot{\Omega} = G_w \omega;$$

wherein $\Omega=[\phi, \theta, \psi]^T$ represents an attitude angle of the aircraft;

$\phi$, $\theta$, $\psi$ represent a roll angle, a pitch angle and a yaw angle, respectively;

$\omega=[p, q, r]^T$ represents an angular rate of the aircraft;

p, q, r represents a roll angular rate, a pitch angular rate and a yaw angular rate, respectively;

a matrix $G_W$ is defined as:

$$G_w = \begin{bmatrix} 1 & \tan\theta\sin\phi & \tan\theta\cos\phi \\ 0 & \cos\phi & -\sin\phi \\ 0 & \sin\phi/\cos\theta & \cos\phi/\cos\theta \end{bmatrix};$$

the dynamic equation of the rotation around the center-of-mass is:

$$J\dot{\omega} + \omega \times J\omega = G_a + \tau + \Delta\tau;$$

wherein $J=\mathrm{diag}\{J_{xx}, J_{yy}, J_{zz}\}$ represents an inertia tensor matrix;

$G_a$ represents a gyroscopic torque;

$\tau$ represents a triaxial torque generated by a propeller;

$\Delta\tau$ represents a lumped torque disturbance;

a control torque $\tau$ is defined as:

$$\tau = \tau_t + \tau_d;$$

wherein $$\tau_t = \sum_{i=1}^{4} \left({}^b O_{p,i} \times R_{p,i}^b R_{p',i}^{p,i} T_i\right)$$

represents a torque generated by four rotor thrusts;

$$\tau_d = \sum_{i=1}^{4} R_{p,i}^b R_{p',i}^{p,i} \left((-1)^{i-1} c_M n_i^2\right)$$

represents a torque formed by a reaction torque for the rotor;

${}^{b}O_{p,i}$ represents a position of an origin of the fixed coordinate system of the propeller disc in the body coordinate system;

$$ {}^{b}O_{p,i} = R_{b}^{p,i} l; $$

$l=[1, 0, 0]^T$ represents a length of an arm; and $c_M$ represents a coefficient of the reaction torque.

4. The method for controlling position and attitude separation of the tiltable rotorcraft according to claim 3, wherein obtaining $$ \begin{bmatrix} {}^{b}f_v \\ \tau \end{bmatrix} = \begin{bmatrix} \sum_{i=1}^{4} R_{p,i}^{b} R_{p',i}^{p,i} T_i \\ \sum_{i=1}^{4} \left({}^{b}O_{p,i} \times R_{p,i}^{b} R_{p',i}^{p,i} T_i\right) + \sum_{i=1}^{4} R_{p,i}^{b} R_{p',i}^{p,i} \left((-1)^{i-1} c_d T_i\right) \end{bmatrix} $$

according to equations of the control force $f_v$ and the control torque $\tau$, which is organized into the following matrix form:

$$ \begin{bmatrix} {}^{b}f_v \\ \tau \end{bmatrix} = A(\alpha) N; $$

wherein $\alpha=[\alpha_1, \alpha_2, \alpha_3, \alpha_4]^T$ represents tilt angles of four rotor assemblies;

$$ N = \left[n_1^2, n_2^2, n_3^2, n_4^2\right]^T $$

represents square of rotor speeds of the four rotor assemblies; and $A(\alpha)$ is a trigonometric function matrix related to a tilt angle $\alpha_i$ of the rotor assembly.

5. The method for controlling position and attitude separation of the tiltable rotorcraft according to claim 4, wherein the tilt angle of the rotor assembly and a rotor speed have the following physical constraints:

$$ \begin{cases} \underline{\alpha} \le \alpha_i \le \overline{\alpha} \\ \underline{n} \le n_i \le \overline{n} \end{cases}; $$

wherein $\underline{\alpha}$, $\overline{\alpha}$, $\underline{n}$, $\overline{n}$ represent feasible physical upper and lower boundaries thereof;

virtual control variables $N_{l,i}$ and $N_{l,i}$ are defined as follows:

$$ \begin{aligned} N_{l,i} &= |N_{l,i}| = T_i s(\alpha_i) = c_T n_i^2 s(\alpha_i) \\ N_{v,i} &= |N_{v,i}| = T_i c(\alpha_i) = c_T n_i^2 c(\alpha_i) \end{aligned}; $$

a relationship among the virtual variables, the control force and the control torque is expressed as follows:

$$ \begin{bmatrix} {}^{b}f_v \\ \tau \end{bmatrix} = \overline{AN}; $$

wherein $\overline{N}=[N_{l,1}, N_{v,1}, N_{l,2}, N_{v,2}, N_{l,3}, N_{v,3}, N_{l,4}, N_{v,4}]$, $\overline{A}$ is a constant matrix, after obtaining the virtual control variables $N_{l,i}$ and $N_{v,i}$, a motor speed and a tilt angle of a steering engine are calculated.

6. The method for controlling position and attitude separation of the tiltable rotorcraft according to claim 1, wherein integrating the six-degree-of-freedom motion equation and the control efficiency model into the control model designed for the control system comprises:

modifying the established six-degree-of-freedom motion equation of the aircraft as the following form:

$$ \begin{cases} \dot{P} = v \\ \dot{v} = g + G_v {}^{b}f_v + d_v \\ \dot{\Omega} = G_{\Omega} \omega \\ \dot{\omega} = -J^{-1}\omega \times J\omega + J^{-1} G_a + J^{-1}\tau + d_{\omega} \end{cases}; $$

$$ \text{wherein } G_v = \frac{1}{m} R_b^e,\ d_v = \frac{1}{m} \Delta f_v, \text{ and } d_{\omega} = J^{-1} \Delta\tau. $$

7. A system for controlling position and attitude separation of a tiltable rotorcraft, comprising a capability prediction module, a position control subsystem, a velocity control subsystem, an attitude angle control subsystem, an angular rate control subsystem, a control allocation module, and a tiltable rotorcraft; after expected position and attitude commands are corrected by the capability prediction module, expected force and torque commands are output by the position control subsystem, the velocity control subsystem, the attitude angle control subsystem, and the angular rate control subsystem, and after receiving the force and torque commands, the control allocation module is further configured to calculate actual control commands of an aircraft including a tilt angle of a rotor assembly and a rotor speed, thus controlling the tiltable rotorcraft to perform the tracking of the expected position and attitude commands.

8. The system for controlling position and attitude separation of the tiltable rotorcraft according to claim 7, wherein a position tracking error is defined as:

$$ e_p = P - P_c = [e_x, e_y, e_z]^T; $$

a performance function of the position control subsystem is defined as:

$$ \rho_p = \mathrm{diag}\{\rho_x(t), \rho_y(t), \rho_z(t)\} $$

$$ \rho_i(t) = \begin{cases} \left(\dfrac{T_i - t}{T_i}\right)^{\frac{1}{1-\lambda_i}} (\rho_{i,0} - \rho_{i,\infty}) + \rho_{i,\infty}, & 0 \le t \le T_i \\ \rho_{i,\infty}, & t > T_i \end{cases}; $$

wherein i=x, y, z;

$T_i$ represents convergence time of set by a user;

$\lambda_i \in (0,1)$, $\rho_{i,0}$ and $\rho_{i,\infty}$ represent an initial value and a steady-state value of the performance function, respectively;

a relationship between the position tracking error and the performance function is as follows:

$$-\underline{b}_i\rho_i(t) < e_i(t) < \bar{b}_i\rho_i(t);$$

wherein $\underline{b}_i$, $\bar{b}_i \in (0,1]$;

a conversion error $\gamma_p$ is defined as:

$$\gamma_p = \frac{1}{2}\left[\ln\frac{\vartheta_x(t)+\underline{b}_x}{\bar{b}_x-\vartheta_x(t)},\ \ln\frac{\vartheta_y(t)+\underline{b}_y}{\bar{b}_y-\vartheta_y(t)},\ \ln\frac{\vartheta_z(t)+\underline{b}_z}{\bar{b}_z-\vartheta_z(t)}\right]^T$$

$$\gamma_i(t) = \pi(\vartheta_i(t)) = \frac{1}{2}\ln\left(\frac{\vartheta_i(t)+\underline{b}_i}{\bar{b}_i-\vartheta_i(t)}\right),\ \vartheta_i(t) = \frac{e_i(t)}{\rho_i(t)};$$

wherein $\vartheta_i(t) \in (\underline{b}_i, \bar{b}_i)$ represents a normalization error;

based on the conversion error $\gamma_p$, guaranteed performance control law of the position control subsystem is:

$$\bar{v} = -k_p\gamma_p + \dot{P}_d + \sigma_p;$$

wherein $$\sigma_p = \left[e_x\dot{\rho}_x/\rho_x,\ e_y\dot{\rho}_y/\rho_y,\ e_z\dot{\rho}_z/\rho_z\right]^T;$$

$k_p$ represents a control gain;

a conversion error $\gamma_\Omega$ of the attitude angle control subsystem is defined as:

$$\gamma_\Omega = \frac{1}{2}\left[\ln\frac{\vartheta_\phi(t)+\underline{b}_\phi}{\bar{b}_\phi-\vartheta_\phi(t)},\ \ln\frac{\vartheta_\theta(t)+\underline{b}_\theta}{\bar{b}_\theta-\vartheta_\theta(t)},\ \ln\frac{\vartheta_\psi(t)+\underline{b}_\psi}{\bar{b}_\psi-\vartheta_\psi(t)}\right]^T;$$

a control law of the attitude angle control subsystem is:

$$\bar{\omega} = -k_\Omega\gamma_\Omega + \dot{\Omega}_d + \sigma_\Omega;$$

wherein $$\sigma_\Omega = \left[e_\phi\dot{\rho}_\phi/\rho_\phi,\ e_\theta\dot{\rho}_\theta/\rho_\theta,\ e_\psi\dot{\rho}_\psi/\rho_\psi\right]^T;$$

$k_\Omega$ represents a control gain.

9. The system for controlling position and attitude separation of the tiltable rotorcraft according to claim 8, wherein a first-order filter is configured to perform expected command smoothing and acquire a corresponding differential signal calculation, and a lumped disturbance force of the velocity control subsystem and a lumped disturbance torque of the angular rate control subsystem are estimated by a disturbance observer;

in the velocity control subsystem:

the first order filter is configured to acquire a smooth signal $v_c$ and a differential signal $\dot{v}_c$ of an expected velocity command $\bar{v}$;

the lumped disturbance force of the velocity control subsystem is estimated by the disturbance observer:

$$\begin{cases} \tilde{e}_v = \hat{v} - v \\ \hat{v} = g + \frac{1}{m}f_v - k_{v1}\theta sig^{\frac{1}{2}}(\tilde{e}_v) - \mu_{v1}(1-\theta)sig^{\frac{2+\alpha_v}{2}}(\tilde{e}_v) + \hat{d}_v; \\ \hat{d}_v = -k_{v2}\theta\,\mathrm{sign}(\tilde{e}_v) - \mu_{v2}(1-\theta)sig^{1+\alpha_v}(\tilde{e}_v) \end{cases}$$

wherein $\tilde{e}_v$ represents an estimated error;

$\hat{v}$ and $\hat{d}_v$ represent an estimated velocity and the lumped disturbance force, respectively;

$$\alpha_v,\ \mu_{v1},\ \mu_{v2} > 0,\ k_{v1} = 1.5\bar{d}_v^{\,1/2},\ k_{v2} = 1.1\bar{d}_v;$$

and $\bar{d}_v$ represents an upper boundary of a change rate of the lumped disturbance force;

$$\theta = \begin{cases} 0, & t \le T_{v,o} \\ 1, & \text{otherwise} \end{cases};$$

wherein $T_{v,o}$ represent parameters of the disturbance observer;

a control law of the velocity control subsystem is:

$${}^b f_{v,c} = G_v^{-1}\left(-k_v e_v - g - \hat{d}_v + \dot{v}_c - \zeta_p\gamma_p\right);$$

wherein $e_v = v - v_c = [e_{vx}, e_{vy}, e_{vz}]^T$ represents a velocity tracking error; and $k_v$ represents a control gain;

in the angular rate control subsystem:

the first-order filter is also configured to acquire a smooth signal $\omega_c$ and a differential signal $\dot{\omega}_c$ of an expected angular rate command $\bar{\omega}$;

the lumped disturbance torque of the angular rate control subsystem is estimated by the disturbance observer:

$$\begin{cases} \tilde{e}_\omega = \hat{\omega} - \omega \\ \dot{\hat{\omega}} = -J^{-1}\omega \times J\omega + J^{-1}G_a + J^{-1}\tau - \\ k_{\omega1}\theta sig^{\frac{1}{2}}(\tilde{e}_\omega) - \mu_{\omega1}(1-\theta)sig^{\frac{2+\alpha_\omega}{2}}(\tilde{e}_\omega) + \hat{d}_\omega \\ \dot{\hat{d}}_\omega = -k_{\omega2}\theta\,\mathrm{sign}(\tilde{e}_\omega) - \mu_{\omega2}(1-\theta)sig^{1+\alpha_\omega}(\tilde{e}_\omega) \end{cases};$$

wherein $\tilde{e}_\omega$ represents an estimated error;

$\hat{\omega}$ and $\hat{d}_\omega$ represent an estimated angular rate and the lumped disturbance torque;

$$\alpha_\omega,\ \mu_{\omega1},\ \mu_{\omega2} > 0,\ k_{\omega1} = 1.5\bar{d}_\omega^{1/2},\ k_{\omega2} = 1.1\bar{d}_\omega;$$

and $\bar{d}_\omega$ represents an upper boundary of a change rate of the lumped disturbance torque;

$$\theta = \begin{cases} 0, & t \le T_{\omega,o} \\ 1, & \text{otherwise} \end{cases};$$

wherein $T_{\omega,o}$ represent parameters of the disturbance observer;

a control law of the angular rate control subsystem is:

$$\tau_c = G_\omega^{-1}(-k_\omega e_\omega + J^{-1}\omega \times J\omega - J^{-1}G_a - \hat{d}_\omega + \dot{\omega}_c - \zeta_\Omega \gamma_\Omega);$$

wherein $e_\omega = \omega - \omega_c = [e_p, e_q, e_r]^T$ represents an angular rate tracking error; and $k_\omega$ represents a control gain.

10. The system for controlling position and attitude separation of a tiltable rotorcraft according to claim 9, wherein according to an expected force and torque given by the velocity control subsystem and the angular rate control subsystem, a virtual control variable is calculated by means of pseudo-inverse control allocation, $$\overline{N} = \overline{A}^{-1}\begin{bmatrix} {}^b f_v \\ \tau \end{bmatrix};$$

after obtaining the virtual control variable $\overline{N}$, a tilt angle of a rotor assembly and a rotor speed are calculated.

* * * * *